(12) United States Patent
Escribano et al.

(10) Patent No.: US 9,486,951 B2
(45) Date of Patent: *Nov. 8, 2016

(54) CLOSED MOLD COMPOSITE MATERIAL MANUFACTURING METHODS, DEVICES, AND SYSTEMS

(71) Applicant: ESE INDUSTRIES, INC., Miami, FL (US)

(72) Inventors: Eric Escribano, Guaynabo, PR (US); Eric S. Escribano, Guaybano, PR (US)

(73) Assignee: ESE INDUSTRIES, INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,301

(22) Filed: Sep. 16, 2015

(65) Prior Publication Data

US 2016/0001480 A1 Jan. 7, 2016

Related U.S. Application Data

(63) Continuation of application No. 13/937,734, filed on Jul. 9, 2013, now Pat. No. 9,162,385.

(60) Provisional application No. 61/669,352, filed on Jul. 9, 2012.

(51) Int. Cl.
| | |
|---|---|
| *B29C 45/72* | (2006.01) |
| *B29C 45/17* | (2006.01) |
| *B29C 45/40* | (2006.01) |
| *B29K 105/12* | (2006.01) |
| *B29L 31/00* | (2006.01) |

(52) U.S. Cl.
CPC ....... *B29C 45/7207* (2013.01); *B29C 45/1701* (2013.01); *B29C 45/40* (2013.01); *B29K 2105/12* (2013.01); *B29L 2031/772* (2013.01)

(58) Field of Classification Search
CPC .......... B29C 45/1701; B29C 45/7207; B29K 2105/12
See application file for complete search history.

(56) References Cited

U.S. PATENT DOCUMENTS

| | | |
|---|---|---|
| 5,505,492 A | 4/1996 | Nelson et al. |
| 5,527,174 A | 6/1996 | Godin et al. |
| 5,863,452 A | 1/1999 | Harshberger, Jr. et al. |
| 7,939,011 B2 | 5/2011 | Young |
| 2002/0125613 A1 | 9/2002 | Cominsky |
| 2004/0219244 A1 | 11/2004 | Filsinger et al. |
| 2010/0327496 A1 | 12/2010 | Wirt et al. |
| 2013/0026678 A1 | 1/2013 | Qin et al. |

*Primary Examiner* — Jill Heitbrink
(74) *Attorney, Agent, or Firm* — Arent Fox LLP (57) ABSTRACT

Methods, devices and systems for closed mold composite material production may include placing an injection tool connected within a pressure chamber, where the injection tool is connected to a material distribution system within the pressure chamber. The methods, devices and systems may also include injecting material at an injection pressure and an injection flow rate, via the material distribution system, into the injection tool and raising an environment pressure of the pressure chamber during the injection process. The methods, devices and systems may include equalizing an injection tool pressure and the environment pressure and adjusting the environment pressure to a curing pressure to cure the material within the injection tool to form a composite product.

9 Claims, 9 Drawing Sheets

| Upper Mold 202 |

| Lower Mold 204 |

CLOSED MOLD COMPOSITE MATERIAL MANUFACTURING METHODS, DEVICES, AND SYSTEMS

CROSS-REFERENCE TO RELATED APPLICATION

This application claims the benefit of priority to U.S. patent application Ser. No. 13/937,734, filed Jul. 9, 2013, which claims the benefit of priority to U.S. Provisional Patent Application No. 61/669,352, filed Jul. 9, 2012. The disclosures of the priority applications are incorporated in their entirety herein by reference.

RELATED APPLICATIONS

This application claims the benefit of priority to U.S. Provisional Application No. 61/669,352 entitled "COMPOSITE MANUFACTURING METHODS, DEVICES, AND SYSTEMS," filed Jul. 9, 2012. The preceding application is incorporated by reference in its entirety herein.

BACKGROUND

In closed mold composite material manufacturing, tooling that is generally used in the manufacturing process should be able to sustain very high cavity pressures that are required to ensure complete laminate saturation and cure the laminates involved in the manufacturing process. In addition, closed mold composite manufacturing may have a long manufacturing cycle because of limits on the injection pressures that the tooling can withstand. Moreover, the tooling that is used in composite manufacturing may have a short life due to the amount of pressure-induced stress that is applied to the tooling with the pressurization of the tooling cavity. Thus, the cycle for composite manufacturing may be long, and the costs of manufacturing may be high, as the cost for manufacturing and replacing the tooling, due to its short shelf life, may be expensive and/or increase the costs of manufacturing.

There is a need in the art for a process which may decrease the composite manufacturing cycle time while maintaining a high quality. There is also a need in the art for a process that reduces the cost of composite manufacturing, specifically that of the tooling used for manufacture. In addition, there is a need in the art for tooling that provides flexibility in composite manufacturing by providing lighter molds that are quickly interchangeable during manufacturing operations.

SUMMARY

Aspects of the present invention relate to closed mold composite material manufacturing methods, devices, and systems. In particular, the described manufacturing process allows for the use of tooling (e.g., molds) to significantly reduce the costs of composite material manufacturing, increase quality standards, increase the injection speed of the matrix material used during the manufacturing, and extend the lifespan of tooling used during manufacturing.

Additional advantages and novel features relating to aspects of the present invention will be set forth in part in the description that follows, and in part will become more apparent to those skilled in the art upon examination of the following or upon learning by practice thereof.

DETAILED DESCRIPTION

The described aspects relate to closed mold composite material manufacturing methods, devices, and systems. In particular, the described manufacturing process allows for the use of tooling (e.g., molds) to significantly reduce the costs of composite manufacturing, increase quality standards, increase the injection speed of the matrix material, either a thermosetting plastic or thermoplastic, used during the manufacturing, and extend the lifespan of tooling used during manufacturing.

In addition, the described aspects may use injection of matrix materials into tooling cavities within a pressure chamber, such as an autoclave, and curing of the composite materials in the pressure chamber. The described aspects may minimize the pressure differential between the inside of the tooling cavities and the outside environment by injecting the matrix material into the tooling cavity inside the one or more pressurized chambers. By minimizing the pressure differential between the tooling cavity and the environment immediately around the tooling cavity and curing the composite materials in a pressure chamber, and pressurizing the entire chamber instead of only pressurizing the tooling, the tooling design may be simplified, the cost of manufacturing reduced, and the production streamlined. Moreover, by applying pressure to the entire chamber, instead of just into the tooling cavity, the quality of the final composite product may be increased through the use of higher pressures, for example, by eliminating bubbles and surface imperfections of the final composite.

Composite materials may include, but are not limited to, reinforced fiber or other laminate materials, which may comprise fiberglass or carbon fibers, resin materials that may be combined with the fiber materials to form the final composite, epoxy resins, other thermosetting plastics, thermoplastics, Kevlar, and aramid, among other advanced composite materials.

Figure 1:
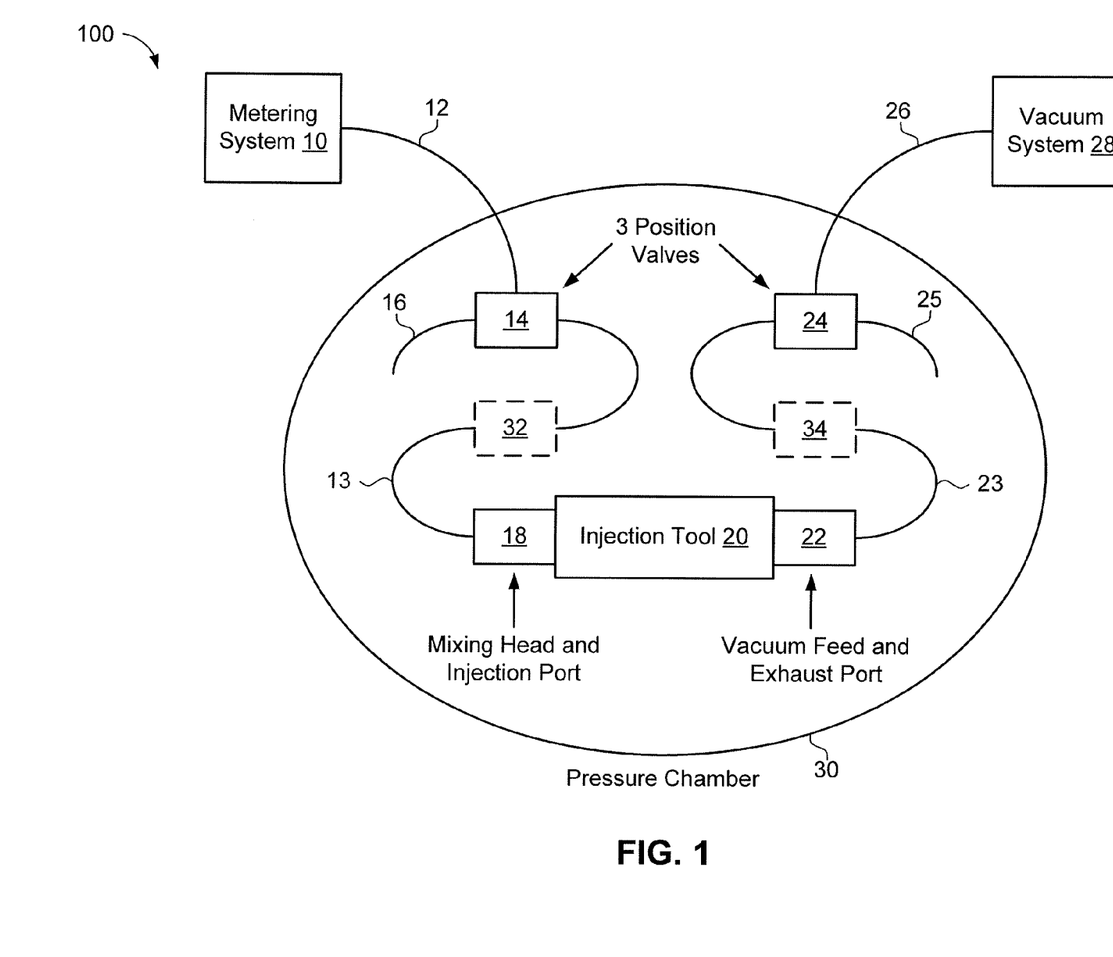
FIG. 1 illustrates an example system in accordance with an aspect of the present invention.

Referring now to FIG. 1, illustrated therein is an example system 100 for composite manufacturing in accordance with an aspect of the present invention. System 100 may include a metering system 10, pressure chamber 30 with one or more injection tools 20, and a vacuum system 28. In an aspect, one or more pressure chambers 30 may be coupled to one or more metering systems 10 and/or vacuum system 28. System 100 may be used to maintain a constant injection flow rate of the composite materials into injection tools 20 and minimize the pressure differential between the inside of injection tool 20 and the environment of the pressure chamber 30 during the injection of the composite materials into injection tools 20.

By maintaining a constant flow rate during the material injection, shorter cycle times may be achieved by the composite manufacturing process. Furthermore, by using higher part curing pressures, made possible by equalizing the pressure between the tooling cavity and the pressure chamber, the parts may include a lower void content and a higher, more consistent, part consolidation. Moreover, by minimizing the pressure differential between the inside of injection tool 20 and the environmental pressure of chamber 30, the speed and efficiency of manufacturing may be increased. In addition, the cost of the manufacturing process may be reduced. For example, by minimizing the pressure differential between the inside of injection tool 20 and the environmental pressure of pressure chamber 30, system 100 may control the amount of stress placed on injection tools 20. The life span of injection tools 20 may be increased when a lower amount of stress is placed on the injection tools. As such, injection tools may not need to be replaced as frequently. In addition, lighter and less expensive materials may be used during the manufacturing process of the tools without compromising the quality of the final manufacturing process.

Metering system 10 may be operable to measure an amount of material to be injected into injection tool 20 and to control the injection flow rate and pressure of the material into injection tool 20. In an aspect, the injection flow rate of the material from metering system 10 to injection tool 20 may be, for example, about 70 grams per second. Metering system 10 may also manage a mix of ratios of the epoxy, thermosetting plastic or thermoplastic, formulation of the material to be injected. An example epoxy formulation may include a mix ratio ranging from about 100:12 to about 100:15 of resin to hardener. One of ordinary skill in the art will recognize, however, that other formulations with different mix ratios may be used. In an aspect, metering system 10 may receive an input indicating an amount of resin to inject into injection tool 20. For example, metering system 10 may receive an input of 210 grams of resin to inject into the injection tool 20. In addition, metering system 10 may also be operable to heat the material to a desired temperature. In an aspect, the desired temperature may range between, for example, about 90° C. to about 120° C. One of ordinary skill in the art will recognize, however, that other temperature ranges may be used. Metering system 10 may also control the injection pressure of the material into injection tool 20. For example, metering system 10 may receive a desired pressure, e.g., 350 psi, and raise the pressure of the material to the desired pressure before injecting the material into injection tool 20. One of ordinary skill in the art will recognize, however, that other desired injection pressures may be used. A pump may be included in metering system 10 to pressurize the material and control the flow of material into the injection tool 20. In an aspect, metering system 10 may be preprogrammed with the amount of material to inject, the injection pressure, and the flow of injection. In another aspect, metering system 10 may receive user input with the amount of material to inject, the injection pressure, and the flow of injection prior to the injection occurring.

Metering system 10 may be coupled to material hose 12 which may allow the delivery of the pressurized material from the metering system 10 to inside of the pressure chamber 30. Material hose 12 may be rated to withstand environmental pressures that may occur within pressure chamber 30.

Material hose 12 may be coupled to a multiple position valve 14, such as a three position valve. Valve 14 may have a plurality of inputs. For example, valve 14 may have a first input from metering system 10 via material hose 12, a second input to injection port 18 via material hose 13, and a third input to the pressure chamber environment via material hose 16. In an aspect, valve 14 may be switched to connect the various inputs into valve 14. For example, in a first position, valve 14 may connect metering system 10 with injection port 18. Thus, as the injection of the material is occurring from metering system 10, valve 14 may be positioned in a first position to allow a normal flow of material from metering system 10 into injection port 18. Valve 14 may be switched to a second position which connects injection port 18 with the pressure chamber environment. When the injection of the material is complete, valve 14 may be switched to a second position from the external air pressure supply from metering system 10 to the environmental pressure within pressure chamber 30. As such, everything downstream from valve 14 may be switched from the pressure of metering system 10 to the environmental pressure of pressure chamber 30. Valve 14 may be rated to withstand the environmental parameters within the chamber.

System 100 may optionally include a material hose splitter 32 operable to split the material flow from metering system 10 to a plurality of injection ports 18 coupled to a plurality of injection tools 20. In an aspect, when a plurality of injection tools 20 are contained within pressure chamber 30, system 100 may include material hose splitter 32 to concurrently allow the injection of material from metering system 10 into a plurality of injection tools 20. As such, a plurality of composite products may be manufactured at the same time within the same pressure chamber 30.

Injection port 18 may be coupled to valve 14 via material hose 13 and coupled to injection tool 20 and serve as an attachment point of the injection of the material into injection tool 20. In an aspect, injection port 18 may mix the material and hardener to create a final mixed product prior to injecting the material into injection tool 20. For example, injection port 18 may mix the resin and hardener flowing from metering system 10 before the resin and hardener are inserted into injection tool 20.

Figure 2:
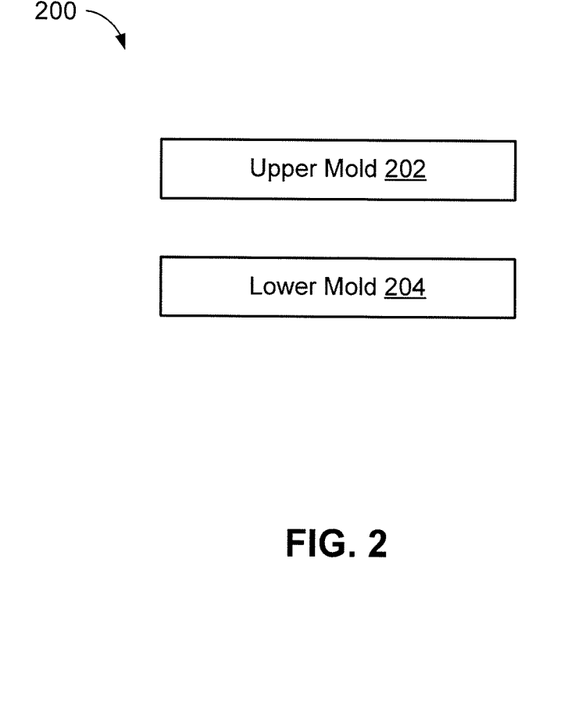
FIG. 2 illustrates an example injection tool in accordance with an aspect of the present invention.

Referring now to FIG. 2, illustrated therein is an example injection tool 200 in accordance with an aspect of the present invention. In an aspect, injection tool 200 may have an upper mold 202 and a lower mold 204 that form a mold shape. The shape of each molding device portion may have a three dimensional shape along the lines of a mold pattern. The upper mold 202 and the lower mold 204 may be sandwiched to form a three dimensional shape. It should be noted that upper mold 202 and lower mold 204 may have a three dimensional shape, and the portions may have corresponding features so as to allow the fibers and resin, when sandwiched there between, to be formed three dimensionally. For example, the described aspects may have over 200 molds with the desired laminate shape that may be used interchangeably with the molds. Moreover, by being able to interchange various molds within the pressure chamber, a higher range of composite parts and/or more complex composite parts may be manufactured.

Referring again to FIG. 1, injection tool 20 may also be coupled to an exhaust port 22 which may be coupled to vacuum system 28 via material hoses 23 and 26. Exhaust port 22 may be opened to allow vacuum system 28 to evacuate and/or remove the air inside injection tool 20.

Exhaust port 22 may optionally be coupled to a vacuum hose splitter 34 which may be operable to consolidate vacuum outflows from a plurality of injection tools 20 into one hose. For example, if a plurality of injection tools 20 are within pressure chamber 30, vacuum hose splitter 34 may consolidate the vacuum outflows from the plurality of injection tools 20 into one hose.

Exhaust port 22 may be coupled to a multiple position valve 24, such as a three position valve. Valve 24 may have a plurality of inputs. For example, valve 24 may have a first input from vacuum system 28 via material hose 26, a second input to exhaust port 22 via material hose 23, and a third input to the pressure chamber environment via material hose 25. In an aspect, valve 24 may be switched to connect the various inputs into valve 24. For example, in a first position, valve 24 may connect vacuum system 28 with exhaust port 22. Valve 24 may be switched to a second position which connects exhaust port 22 with the pressure chamber environment. As such, everything upstream from valve 24 may be switched from the vacuum system 28 to the environmental pressure of pressure chamber 30.

Figure 3A:
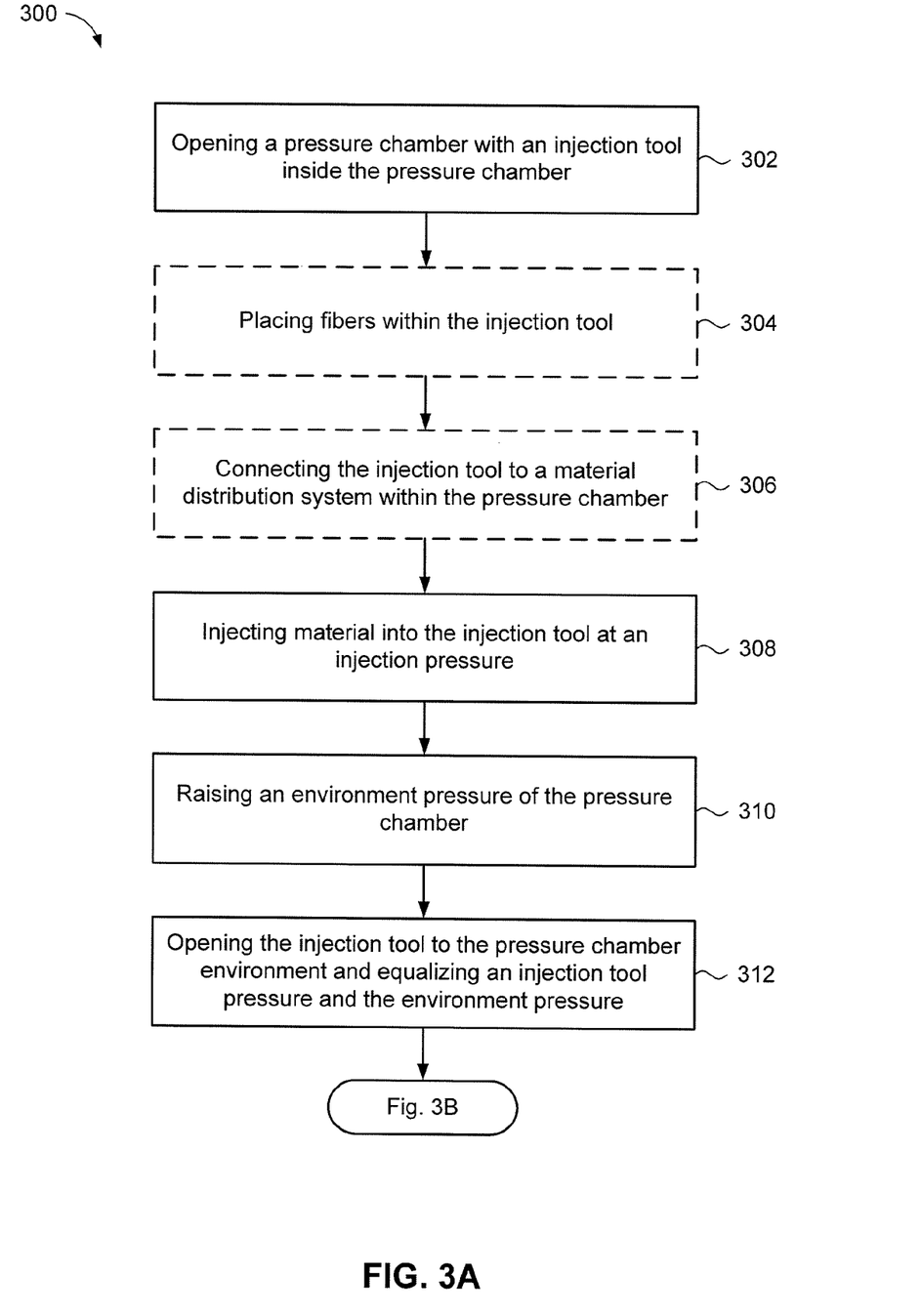
FIGS. 3A and 3B illustrate an example method flow for composite manufacturing in accordance with an aspect of the present invention.
Figure 3B:
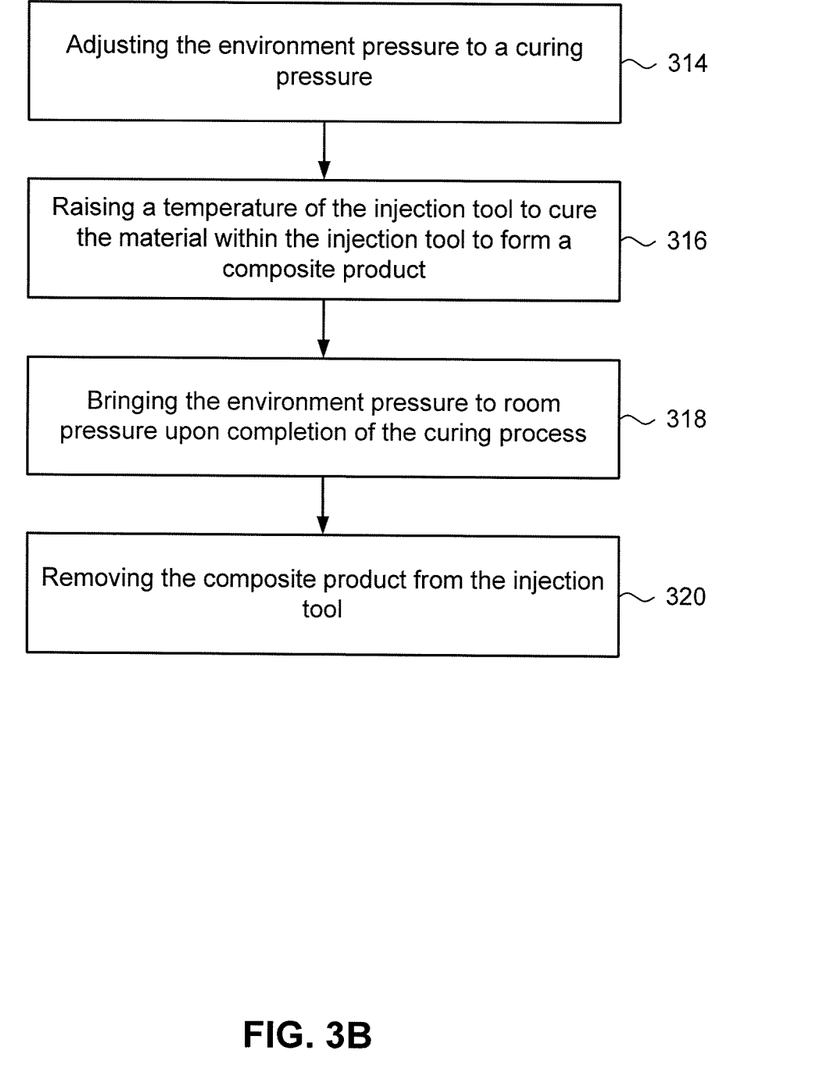

Referring now to FIGS. 3A and 3B, illustrated therein is an example method flow 300 for composite manufacturing in accordance with an aspect of the present invention. The method may include opening a pressure chamber with an injection tool inside the pressure chamber 302. One or more injection tools may be placed inside of a pressure chamber, such as an autoclave. In an aspect, a machine may be programmed to open the pressure chamber and place the various injection tools inside the pressure chamber. In another aspect, a user may open the pressure chamber and place the various injections tools inside the pressure chamber.

The method may optionally include placing fibers within the injection tool 304. For example, the dry fibers may be cut and/or shaped into a pattern to create a desired shape. In an aspect, a machine may be programmed to cut the fibers into a pattern to create the desired shape. The cut fibers may represent the desired shape in a two dimensional fashion. The desired shape may include, for example, a shape of an item to be formed into the composite, such as the shape of a fender for a vehicle, the shape of sporting equipment, and/or the shape of aerospace components, among other shapes. It should be noted that the fibers may be cut and/or shaped into a variety of shapes.

Figure 5A:
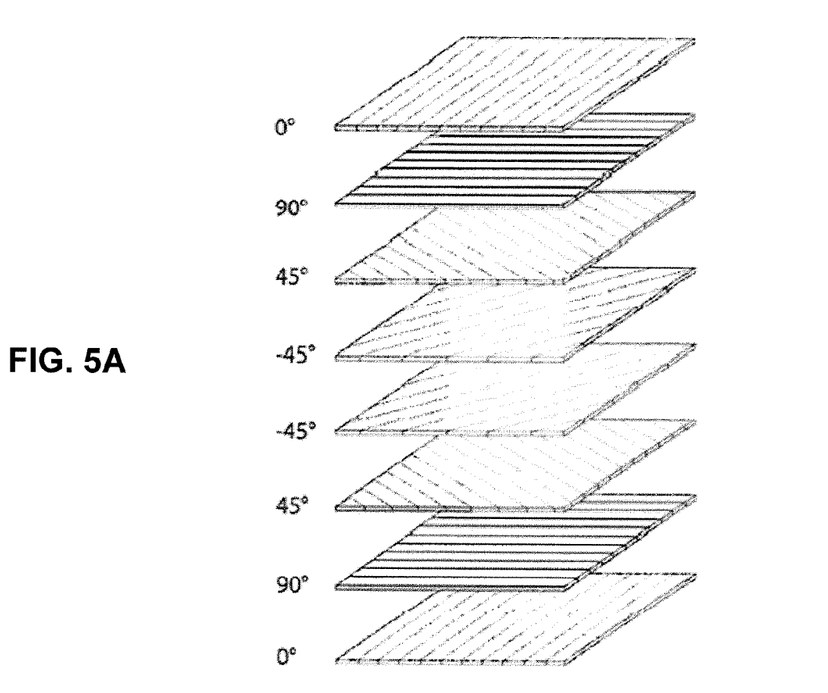
FIG. 5A illustrates an example diagram of a plurality of fiber sheets with different alignments in accordance with aspects of the present invention.

The cut fiber sheets may also be placed into a stack of fiber sheets in the desired shape. For example, a machine may stack the cut fiber sheets into a stack. The stack may include, for example, eight layers of carbon fiber. In an aspect, the fiber sheets may be cut and/or shaped in different fiber direction orientations so as to enhance the strength of the overall stack encompassed in the composite item to be formed. FIG. 5A illustrates a partially exploded diagram of a plurality of fiber sheets oriented relative to one another, which are then stacked and combined so as to form a single stacked/combined sheet of fibers.

Figure 5B:
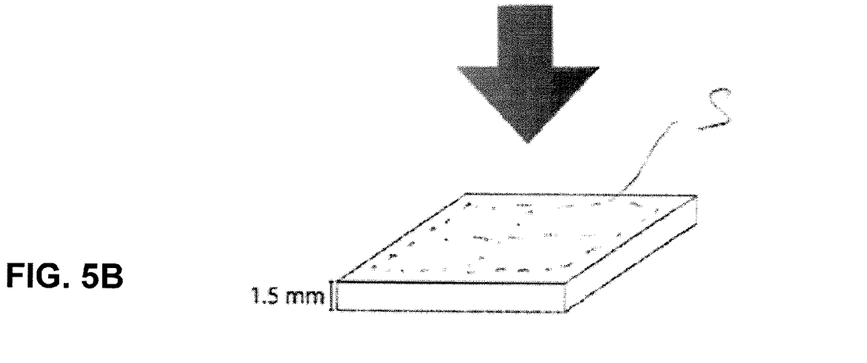
FIG. 5B illustrates an example fiber sheet stitching in accordance with aspects of the present invention.

The fiber sheets may optionally be stitched together. In an aspect, a machine may stitch the stack of fiber sheets, for example, about the edges of the fiber sheets and/or in one or more lines or other patterns within the edges of the fiber sheets, such as across the sheets. FIG. 5B illustrates an example stitching S of the stacked fiber sheet.

In addition, the method may optionally include connecting the injection tool to a material distribution system inside the pressure chamber 306. In an aspect, injection tool 20 (FIG. 1) may be connected to injection port 18 (FIG. 1) and exhaust port 22 (FIG. 1). Injection tools may be interchangeably placed within the pressure chamber depending on the type of product being manufactured. Moreover, by being able to interchange various molds within the pressure chamber, a higher range of composite parts and/or more complex composite parts may be manufactured.

The method may also include injecting material into the injection tool at an injection pressure 308. For example, metering system 10 (FIG. 10) may measure an amount of material to inject into the system, pressurize the material to an injection pressure, and may control the flow of material into injection tool 20. As material enters into the injection tool, the injection tool pressure may begin to rise based upon the pressure at which the material is injected into the injection tool. In an aspect, the metering system may be preprogrammed with the amount of material to inject, the injection pressure, and the flow of injection. In another aspect, the metering system may receive an amount of material to inject, the injection pressure, and the flow of injection prior to the injection occurring from user input.

In an aspect, the fibers may be injected into injection tool 20 along with the resin. Thus, instead of pre-placing the fibers in injection tool 20, the fibers may be chopped and injected along with the resin into the injection tool 20. It should be noted that the fibers may be inserted into the injection tools in a variety of manners.

The method may further include raising the environment pressure of the pressure chamber 310 as the pressure within the tooling cavity increases. In an aspect, nitrogen gas may be pumped into the pressure chamber to raise the environment pressure of the pressure chamber. By raising the environment pressure of the pressure chamber through the use of a pressurization system, the pressure difference between the pressure chamber and the injection tool may be minimal. For example, the pressurization system may include a nitrogen pressurization system.

The method may also include opening the injection tool to the pressure chamber environment and equalizing the injection tool pressure and the environment pressure 312. Upon the completion of the material injection, the injection tool is opened to the environment of the pressure chamber allowing the injection tool pressure and the environment pressure of the pressure chamber to equalize. For example, if the metering system 10 injected the epoxy formulation into the injection tool 20 at 350 psi, the pressure inside the injection tool pressure should be around 350 psi. In addition, if the environmental pressure inside the pressure chamber 30 was brought to 375 psi, the pressure differential between the injection tool pressure and the environment pressure may be around 25 psi. When the injection tool is opened to the environment of the pressure chamber, the injection tool pressure may rise to 375 psi, and thus, equalizing the injection tool pressure and the environment pressure. The equalization of the pressures may be carried out through the use of the multiple position valve 14, 24.

The method may also include adjusting the environment pressure to a curing pressure 314. For example, the environment pressure may be increased to a curing pressure so that the material is cured at a higher pressure. As the pressure increases, the quality of the composite product produced by the curing method may be increased. In one example, the pressure may be raised to 500 psi for the curing process.

In addition, the method may include raising a temperature of the injection tool to cure the material within the injection tool to form a composite product 316. For example, the temperate may be raised to accelerate the curing process.

The time period for the curing process may be based on the chemistry involved for the materials used. Example time periods for the curing process may include 3 minutes, 10 minutes, or longer time periods, such as 24 hours.

The heat and/or pressure may be applied about the entire injection tool. The air in the chamber may directly compress the laminate and may cure the resin. Air bubbles and surface imperfections of the final composite may be eliminated by applying pressure to the laminate while it is curing, thus ensuring minimal air content within the laminate. The temperature of the heat may be based, for example, on the specific resin being used.

By applying the pressure to the entire pressurized chamber and not just to the molding cavity within the tooling, a lower strength tool may be used than in the related art devices, in which pressure is applied exclusively to the tooling cavity. Moreover, in accordance with aspects of the present invention, multiple tools may be interchangeably used within the same pressure chamber. Thus, the manufacturing volume may be increased by placing multiple tools into the same pressure chamber to form multiple final composite products. In addition, the overall tooling is significantly less costly than the tooling in the related art because by using the barometric pressure in the chamber to compress the molding, each molding device does not need heavy and costly reinforcement structures in order to sustain the pressure within the molding device. Thus, the costs of the tooling may be reduced.

The method may include bringing the environmental pressure to room pressure upon completion of the curing process 318 and removing the composite product from the injection tool 320. The composite product (e.g., a fully-hardened composite material laminate) may be in the shape of the injection tool. For example, a machine may remove the composite product from the injection tool. The method may proceed to 302 and repeat for a new composite product.

Figure 4A:
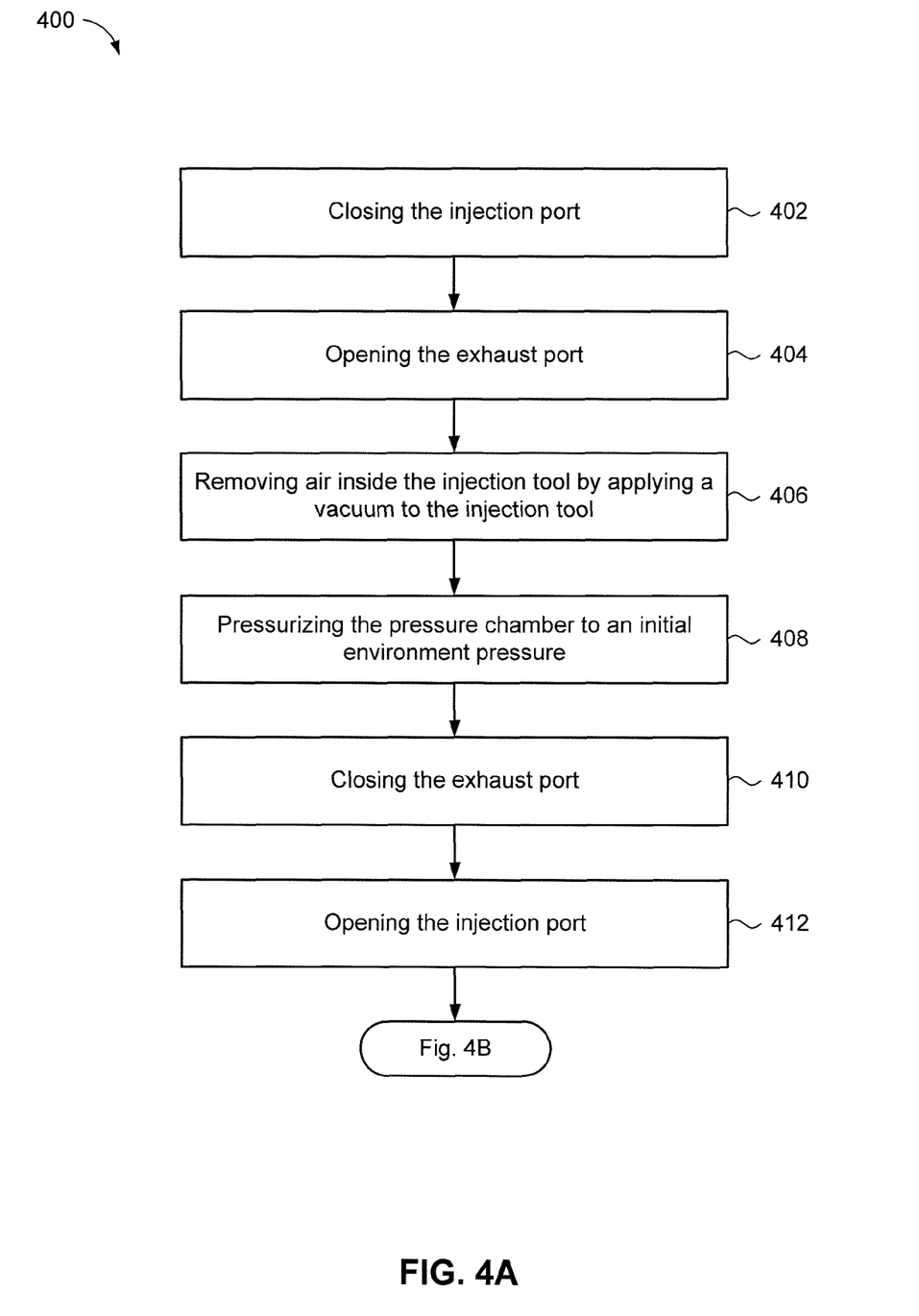
FIGS. 4A and 4B illustrate an example method flow for injecting material into a pressure chamber in accordance with an aspect of the present invention.
Figure 4B:
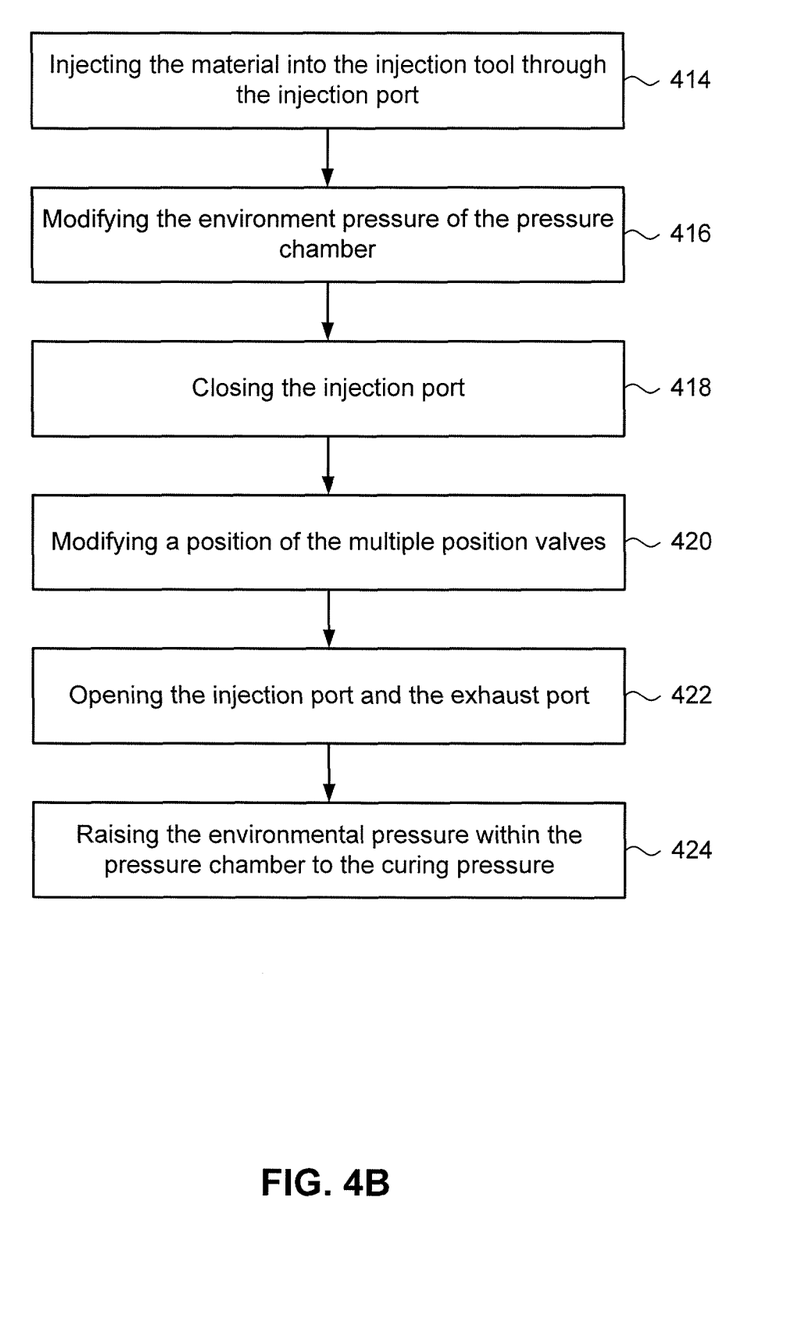

Referring now to FIGS. 4A and 4B, illustrated therein is an example method flow 400 for an injection process in accordance with an aspect the present invention. Method 400 may be used, for example, during the injection of the materials from metering system 10 (FIG. 1) to injection tool 20 (FIG. 1).

The method may include closing injection port 402 and opening the exhaust port 404. For example, when injection port 18 (FIG. 1) is closed, material from metering system 10 is prevented from entering into injection tool 20. In addition, by opening exhaust port 22 (FIG. 1), the vacuum system 28 (FIG. 1) may be able to apply a vacuum to injection tool 20. In addition, the valves 14 and 24 (FIG. 1) are positioned such that the injection and vacuum feed circuits are complete so the material may flow into injection tool 20 and the air may be removed from injection tool 20.

In addition, the method may include removing air inside the injection tool by applying a vacuum to the injection tool 406. By removing the air from within the injection tool, it may be easier to inject the material into the injection tool. For example, the drag of injection may be minimized when the air is removed from the injection tool. In addition, by removing the air from the injection tool, a higher quality of product may be produced by avoiding a high percentage of bubble concentrations after the injection is complete. In an aspect, vacuum system 28 may apply a full vacuum to injection tool 20 to remove all the air from inside injection tool 20.

The method may also include pressurizing the pressure chamber to an initial environment pressure 408. In an aspect, the environment pressure may be pressurized to an initial pressure of 25 psi (1.723 bars), for example.

The method may also include closing the exhaust port 410 and opening injection port 412. For example, by closing exhaust port 22, vacuum system 28 may no longer remove air from injection tool 20. In addition, by opening injection port 18, metering system 10 may be able to inject material into injection tool 20.

The method may include injecting the material into the injection tool through the injection port 414. For example, mixed material may be pumped from metering system 10 through injection port 18 into injection tool 20. In an aspect, metering system 10 may be preprogrammed with an injection flow rate for injecting the material into injection tool 20 and may inject the material at the flow rate.

The method may also include modifying the environment pressure of the pressure chamber 416. As more material is injected into the tooling cavity, the injection pressure may rise to maintain the desired flow rate of material, as this happens, the environmental pressure of the pressure chamber may be increased to maintain a positive pressure differential between the environment pressure and the injection tool pressure. In an aspect, the pressure differential may be minimized to, e.g., around 10 psi (0.689 bars) and the maximum injection tool pressure may be limited to, e.g., 425 psi (29.302 bars). By minimizing the pressure differential between the injection tool and the outside environment by conducting the material injection within a pressurized chamber, the structural stress on the injection tool may be minimized and the cost of the injection tools and materials used during composite manufacturing may be reduced. In addition, by having direct control over the environmental pressure outside of the injection tool, the material may be injected at a constant flow rate while varying the injection pressure as needed to maintain the desired flow rate.

In addition, the method may include closing the injection port 418. Once the injection is complete, the injection port may be closed to prevent any additional material from being injected into the injection tool.

The method may include modifying a position of the multiple position values 420 and opening the injection port and the exhaust port 422. For example, injection port 18 and exhaust port 22 may be opened. In addition, valves 14 and 24 may be switched to connect the environment of pressure chamber 30 to injection tool 20. By opening the valves to the environment of pressure chamber 30, the pressure difference between the injection tool pressure and the environment pressure may be equalized.

The method may further include raising the environmental pressure within the pressure chamber to the curing pressure 424. The environmental pressure of the pressure chamber may be raised to the desired curing pressure to ensure minimal void content for the part being manufactured.

Figure 6:
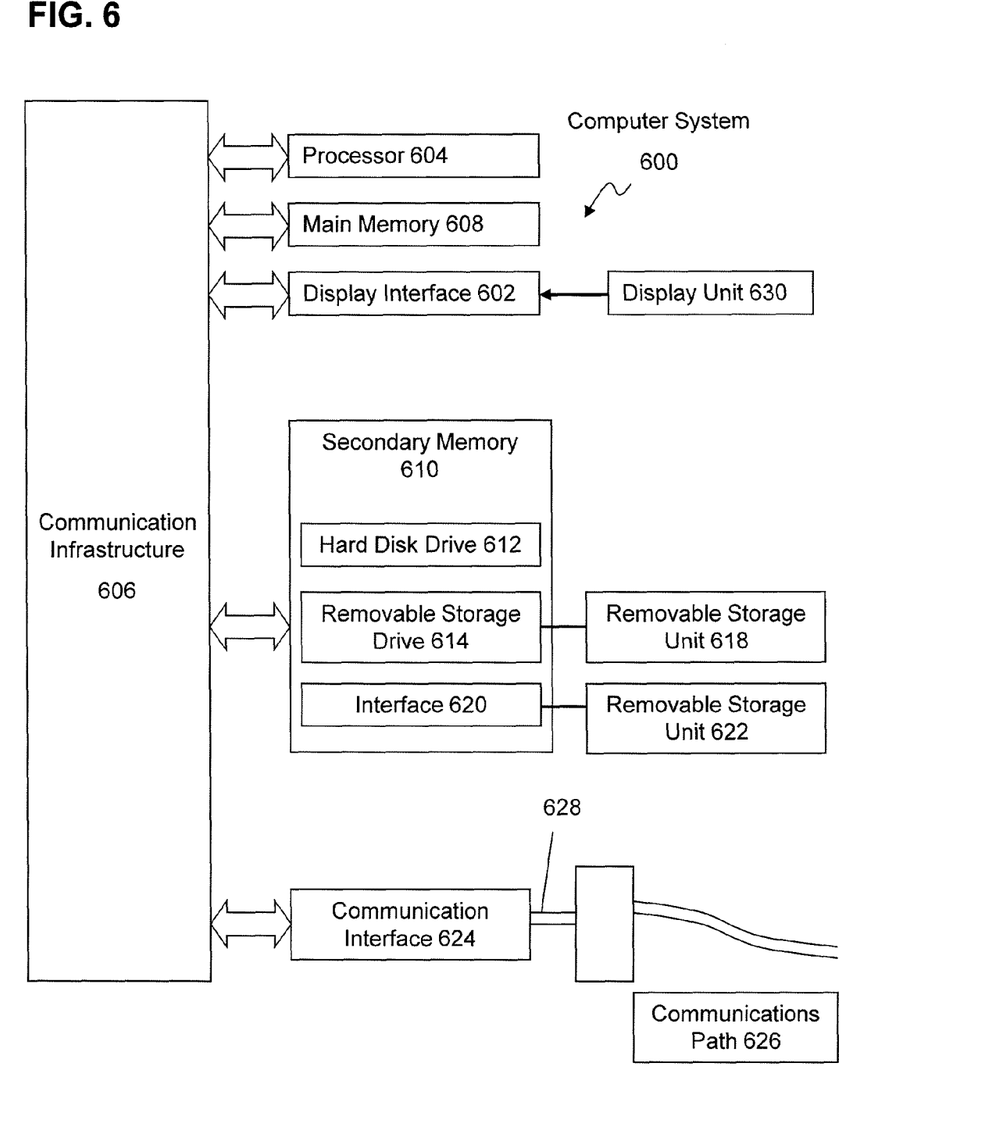
FIG. 6 illustrates various features of an example computer system for use in conjunction with aspects of the present invention.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this exemplary computer system.

After reading this description, it will become apparent to a person skilled in the relevant art(s) how to implement aspects of the invention using other computer systems and/or architectures.

Computer system 600 can include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, a universal serial bus (USB) flash drive, etc. The removable storage drive 614 reads from and/or writes to a removable storage unit 618 in a well-known manner. Removable storage unit 618 represents a floppy disk, magnetic tape, optical disk, USB flash drive etc., which is read by and written to removable storage drive 614. As will be appreciated, the removable storage unit 618 includes a computer usable storage medium having stored therein computer software and/or data.

Alternative aspects of the present invention may include secondary memory 610 and may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and signals 628. These computer program products provide software to the computer system 600. Aspects of the invention are directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features in accordance with aspects of the present invention, as discussed herein. In particular, the computer programs, when executed, enable the processor 604 to perform the features in accordance with aspects of the present invention. Accordingly, such computer programs represent controllers of the computer system 600.

In an aspect of the present invention that is implemented using software, the software may be stored in a computer program product and loaded into computer system 600 using removable storage drive 614, hard drive 612, or communications interface 620. The control logic (software), when executed by the processor 604, causes the processor 604 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

In yet another aspect of the present invention, features thereof is implemented using a combination of both hardware and software.

Figure 7:
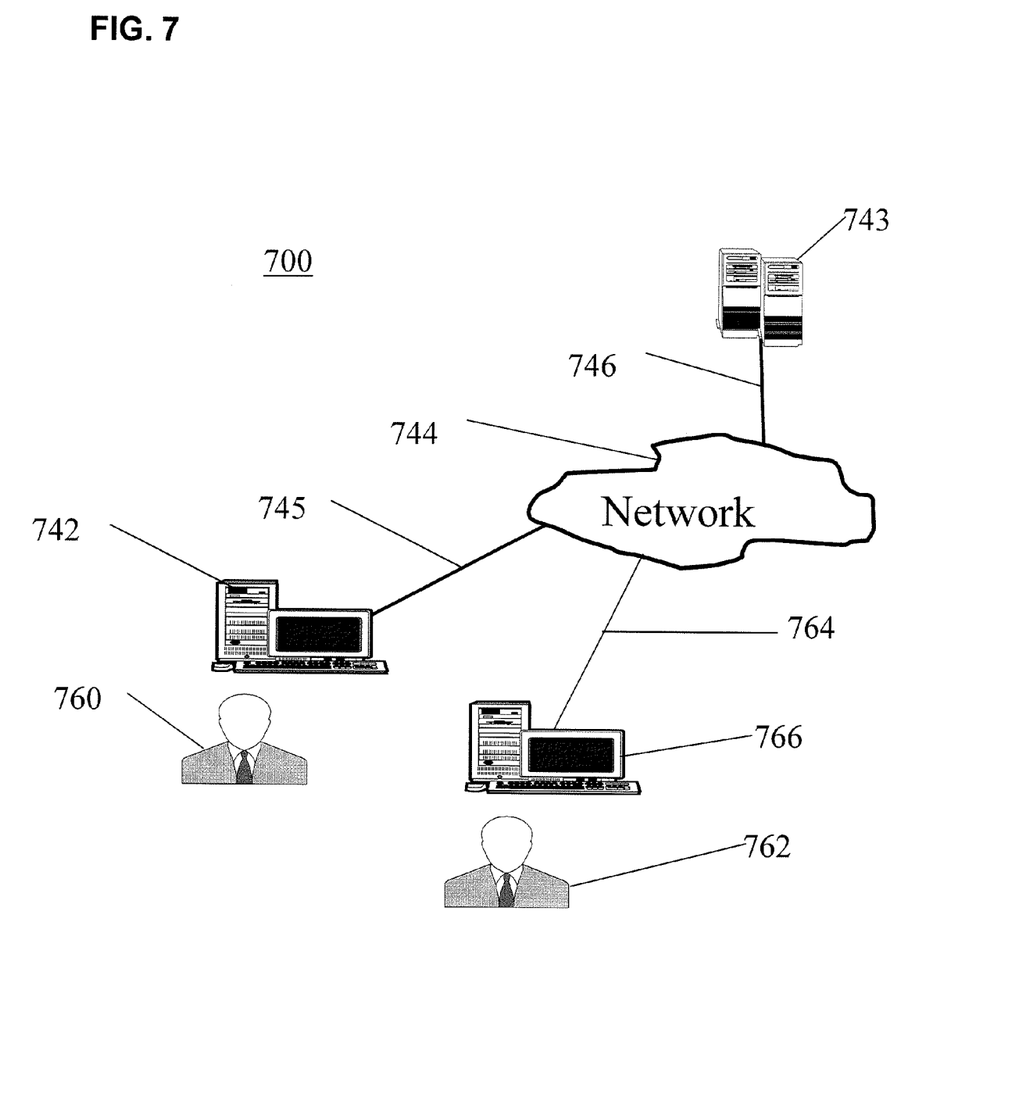
FIG. 7 illustrates an exemplary system diagram of various hardware components and other features for use in accordance with aspects of the present invention.

FIG. 7 shows a communication system 700 usable in accordance with aspects of the present invention. The communication system 700 includes one or more accessors 760, 762 (also referred to interchangeably herein as one or more "users") and one or more terminals 742, 766. In one aspect of the present invention, data for use is, for example, input and/or accessed by accessors 760, 764 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiberoptic links. In another variation the present invention, the method and system in accordance with aspects of the present invention operate in a stand-alone environment, such as on a single terminal.

While aspects of the present invention have been described in connection with examples thereof, it will be understood by those skilled in the art that variations and modifications of the aspects of the present invention described above may be made without departing from the scope hereof. Other aspects will be apparent to those skilled in the art from a consideration of the specification or from a practice in accordance with aspects of the invention disclosed herein.

The invention claimed is:

1. A method for closed mold composite material production, comprising:
   placing an injection tool within a pressure chamber, wherein the injection tool is connected to a material distribution system;
   injecting material at an injection pressure and an injection flow rate, via the material distribution system, into the injection tool;
   raising an environment pressure of the pressure chamber to maintain a positive pressure differential between the environment pressure and an injection tool pressure;
   upon completion of injecting the material into the injection tool, minimizing a pressure differential between the environment pressure and the injection tool pressure by opening the injection tool to an environment of the pressure chamber;
   adjusting the environment pressure to a curing pressure;

applying a heat to the material at the curing pressure to cure the material within the injection tool to form a composite product; and removing the composite product from the injection tool.

2. The method of claim 1, wherein minimizing the pressure differential between the environment pressure and the injection tool pressure includes raising the injection tool pressure.

3. The method of claim 1, wherein minimizing the pressure differential between the environment pressure and the injection tool pressure includes raising the injection tool pressure to the environment pressure.

4. The method of claim 1, further comprising varying the injection pressure to maintain a constant injection flow rate.

5. The method of claim 1, further comprising placing fibers within the injection tool, wherein the fibers are cut in a pattern to create a desired three dimensional shape.

6. The method of claim 1, wherein the material comprises chopped fibers and a matrix material.

7. The method of claim 1, wherein the material comprises a matrix material including a thermosetting plastic or thermoplastic.

8. The method of claim 1, wherein the injection tool comprises an upper mold and a lower mold.

9. The method of claim 1, wherein a plurality of injection tools are placed within the pressure chamber and the material distribution system is connected to the plurality of injection tools.

* * * * *